Dec. 10, 1940.  A. H. PEGLOW  2,224,408
DEVICE FOR WHEEL SUSPENSION
Original Filed Oct. 7, 1937
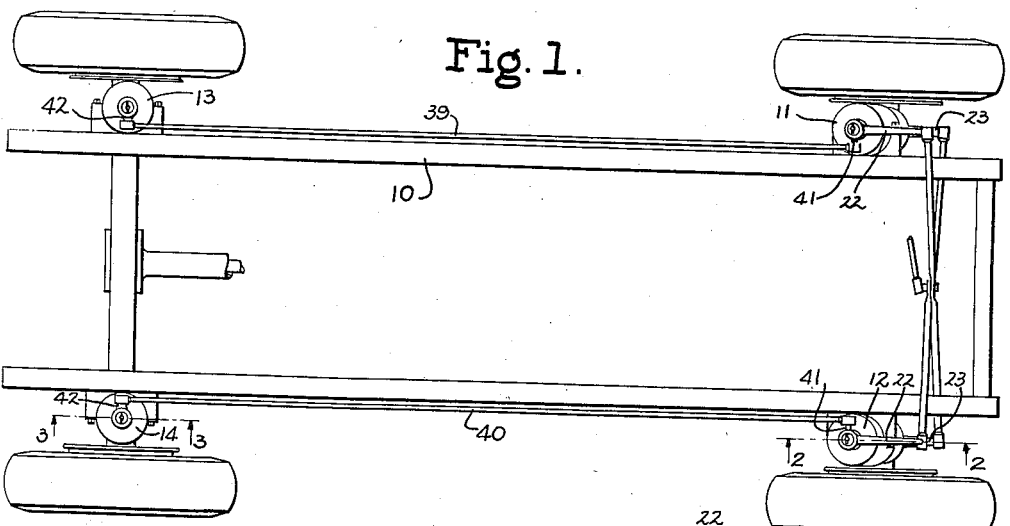
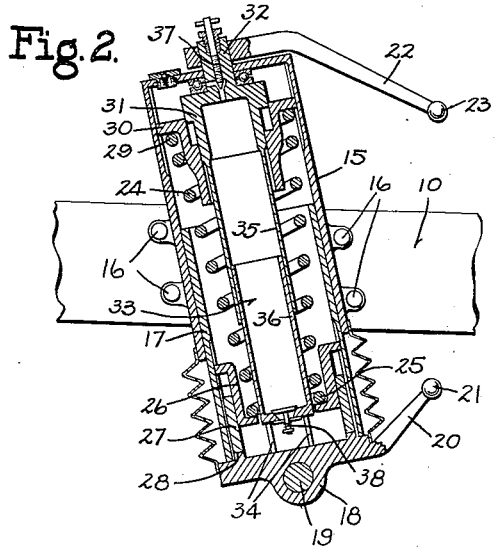
INVENTOR
ALBERT H PEGLOW
BY
Gerald P. Welch
ATTORNEY Patented Dec. 10, 1940

2,224,408

UNITED STATES PATENT OFFICE 2,224,408

DEVICE FOR WHEEL SUSPENSION

Albert H. Peglow, Cudahy, Wis.

Original application October 7, 1937, Serial No. 167,001. Divided and this application January 10, 1938, Serial No. 184,136

1 Claim. (Cl. 267—60)

This invention relates to improvements in devices for wheel suspension, and is divisional to my application bearing the Serial Number 167,001, filed October 7, 1937.

An object of the invention is to provide individual wheel suspension in a vehicle which will shift the center of gravity thereof when the same is making a turn in travel.

Another object of the invention is to provide improved wheel suspension throughout the vehicle which will be of such structure as greatly to improve and simplify the lubrication thereof.

Other and further objects of the invention will appear as the description proceeds, reference being had to the accompanying drawing, in which:

Fig. 1 is a plan view of an automobile frame and wheel suspension assembly embodying my invention.

Fig. 2 is a sectional view taken on line 2—2 of Fig. 1.

Fig. 3 is a view on line 3—3 of Fig. 1.

Fig. 4 is a rear view in elevation of the rear wheel suspension assembly.

Fig. 5 is a view showing partly in elevation and partly in section the upper cam assembly employed in the device, and in elevation the lower cam assembly.

Referring more particularly to the drawing, the numeral 10 represents the conventional frame of a vehicle. Attached to the side members thereof are the front suspension members 11 and 12 which are inclined backwardly from the perpendicular.

Each front suspension member is comprised of an upper tubular member 15 secured as by the rivets 16 to the frame 10 and engaging slidingly therein the inner tubular member 17. Affixed to the lower end of the inner tubular member 17 is a journal bearing 18 adapted to receive the front wheel axle 19 and having integral therewith the arm 20 adapted to connect at 21 thereof with a steering tie rod.

The upper and outer tubular member 15 has pivotally affixed at the top thereof the arm 22 which is adapted at 23 thereof to engage with a steering tie rod. A coiled compression spring 24 is held within the telescoping tubular members 15 and 17. The lower end, 25, of spring 24 is attached to the upper male cam 26. A complementary lower cam 27 is cylindrical in form and is affixed by its lower edge 28 to the member 18. The upper end 29 of spring 24 is affixed to the lower member 30 of the top cam assembly which is completed by the inner member 31 which latter is surmounted by the valve housing 32.

A hydraulic shock-absorbing unit 33 is disposed interiorly of the coil spring 24, and is affixed to member 18 by a plurality of studs 34. The upper end of the unit 33 is integral with the cam portion 31. The unit 33 comprises a pair of telescoping tubes, 35 and 36, which serve also as an oil reservoir. A needle valve 37 communicates with and surmounts the upper and outer tube 35 of unit 33, and a spring loaded valve 38 is disposed in the bottom end portion of the lower and inner tube 36. The structure of the rear wheel suspension is similar, but lacks the lower cam assembly present in the front units.

A pair of rods, 39 and 40, extend longitudinally of the vehicle, and are connected by the pairs of arms 41 and 42 to the upper front and rear cams, respectively, thus causing identical action of the top front and rear cams.

In use, the cams are so arranged in the front wheel suspension assemblies, that when the front wheels are turned in rounding a corner, the cams in the assembly on the inside of the turn will contract, whereas the cams on the opposite side will expand, thus raising that side of the vehicle.

It will be understood that the device is capable of many modifications in structure and design, without departing from the spirit of the invention, within the scope of the appended claim.

Having thus described my invention, what I claim and desire to secure by Letters Patent of the United States, is:

In a vehicle supported by steerable wheels at its front end, telescoping sleeve members connecting said vehicle with the wheels, coil spring means within the sleeves to maintain them in extended relation, one of the said sleeves being turnable with the wheel as the latter is steered, an internally threaded flanged member fixed to the top of the coil spring and connected to the other of said sleeves for axial nonrotating movement relative thereto, a worm cam engaged within said flanged member and adapted to extend the sleeve members relatively when it is moved in one direction and to telescope the sleeve members inwardly when it is moved oppositely, a cup member fixed to the lower end of the turnable sleeve, cam surfaces on the upper edges of said cup member, and a worm cam engaging said cam surfaces and connected to said turnable sleeve for axial non-rotating movement relative thereto, said worm cam being attached to the lower end of the coil spring and also adapted to extend the sleeve members relatively when it is moved in one direction and to telescope the sleeve members inwardly when it is moved oppositely against said cam surfaces, the cams and sleeves of one side of the vehicle being arranged to extend when the cams and sleeves of the other side of the vehicle telescope inwardly.

ALBERT H. PEGLOW.